(12) United States Patent
Farzami et al.

(10) Patent No.: US 11,172,060 B1
(45) Date of Patent: Nov. 9, 2021

(54) COMMUNICATION DEVICE HAVING ANTENNA TUNING BASED ON HAND POSITION DETECTED BY EDGE DISPLAY

(71) Applicant: MOTOROLA MOBILITY LLC, Chicago, IL (US)

(72) Inventors: Farhad Farzami, Chicago, IL (US); Seiran Khaledian, Chicago, IL (US); Armin Klomsdorf, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/175,648

(22) Filed: Feb. 13, 2021

(51) Int. Cl.
*H04M 1/72448* (2021.01)
*H01Q 1/27* (2006.01)
*H04B 1/401* (2015.01)
*H04M 1/02* (2006.01)

(52) U.S. Cl.
CPC ........ *H04M 1/72448* (2021.01); *H01Q 1/273* (2013.01); *H04B 1/401* (2013.01); *H04M 1/0202* (2013.01)

(58) Field of Classification Search
CPC .................................................. H04M 1/72448
See application file for complete search history.

(56) References Cited

U.S. PATENT DOCUMENTS

| 9,209,849 B2 | 12/2015 | Kim et al. | |
| 2007/0037619 A1* | 2/2007 | Matsunaga | H04B 1/3838 455/575.7 |
| 2014/0335916 A1* | 11/2014 | Thorson | H04M 1/0281 455/566 |
| 2016/0173172 A1* | 6/2016 | Greene | H04B 7/0802 455/562.1 |
| 2016/0357323 A1* | 12/2016 | Kim | G06F 1/1652 |

* cited by examiner

*Primary Examiner* — Hsinchun Liao
(74) *Attorney, Agent, or Firm* — Isidore PLLC

(57) ABSTRACT

A communication device, method and computer program product enable improved communication performance by switching or tuning antennas based on detecting touches on edge display(s) of the communication device that has at least one antenna positioned along edges of a housing assembly. A controller monitors edge display(s) of the communication device to determine portions of the edge display(s) that are touched and associates the at least one antenna that is proximate to the portions of the edge display(s) that are touched The controller configures a radio frequency front end of the communication device to switch or tune the at least one antenna in order to provide at least one of: mitigating detrimental effects to antenna performance by the at least one antenna or remaining within regulatory limits for RF transmission exposure.

19 Claims, 12 Drawing Sheets

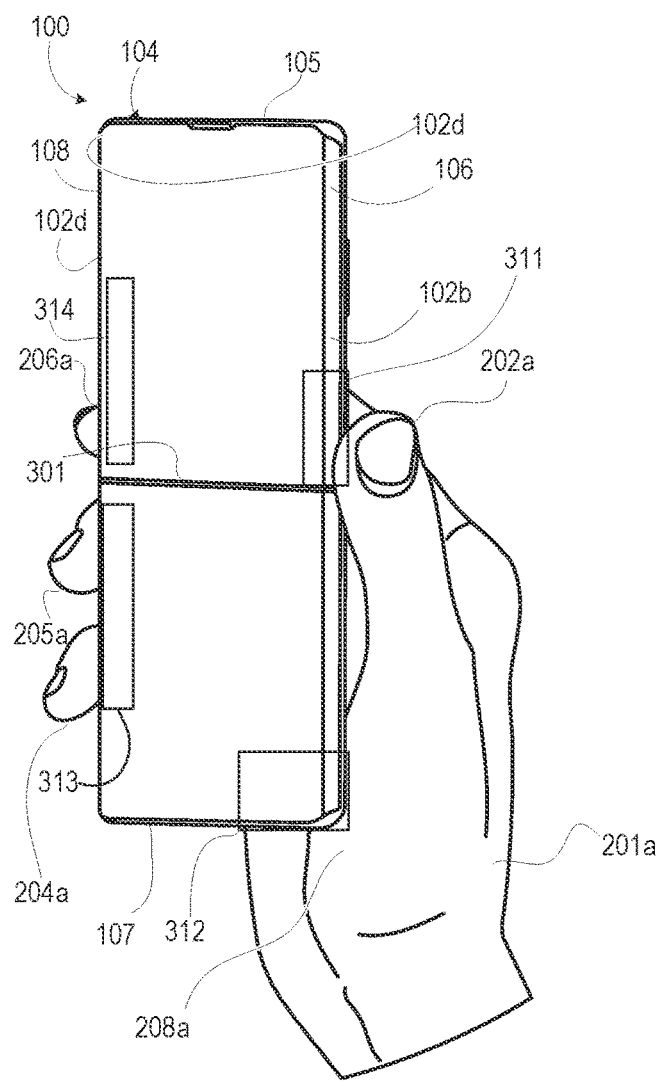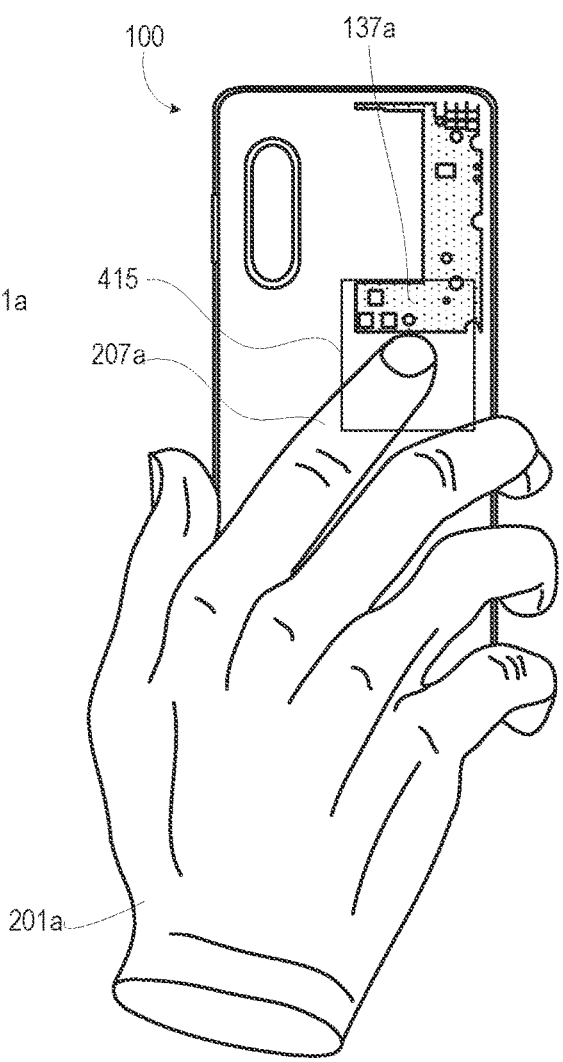
FIG. 3
FIG. 4

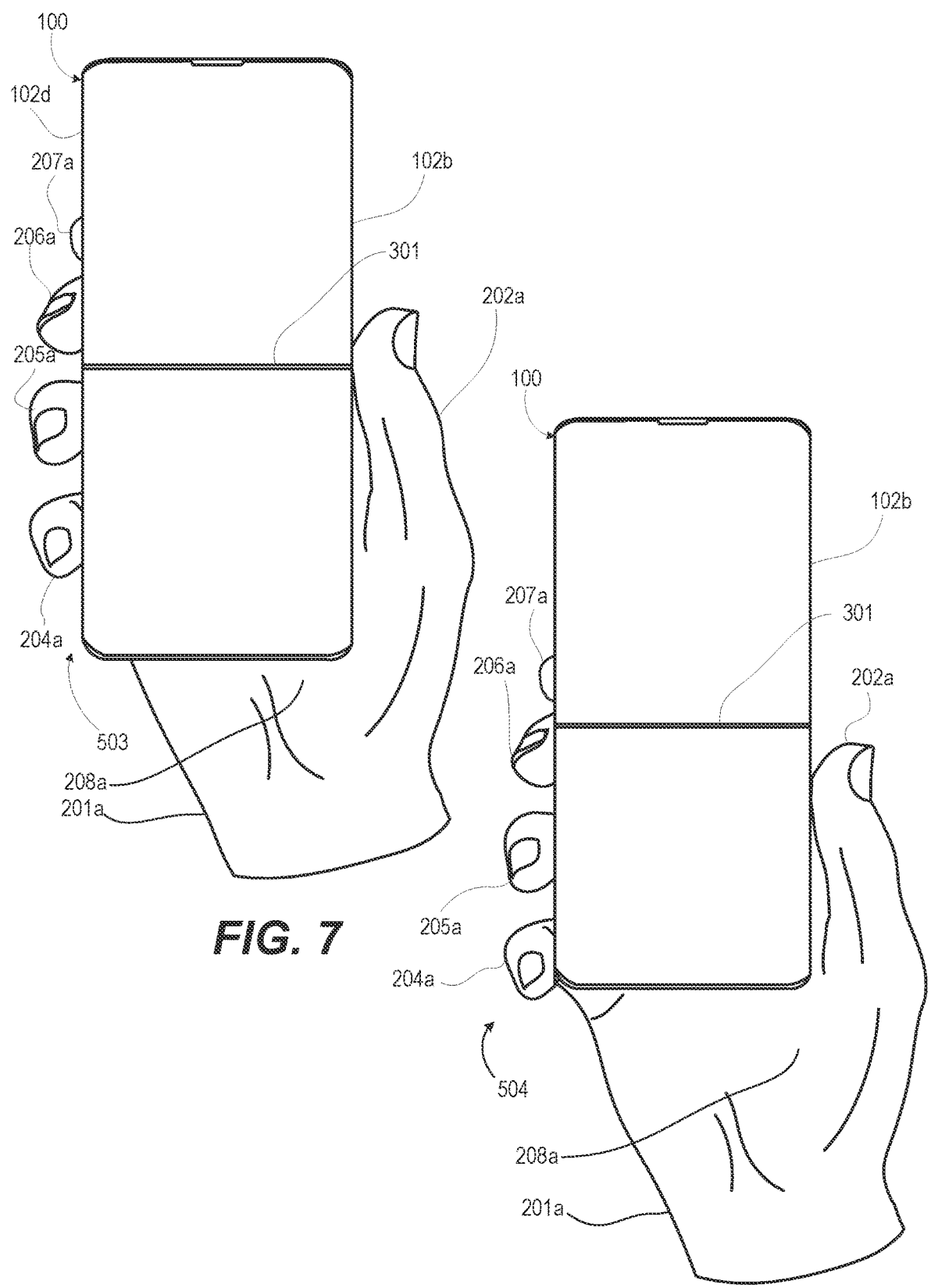

COMMUNICATION DEVICE HAVING ANTENNA TUNING BASED ON HAND POSITION DETECTED BY EDGE DISPLAY

1. TECHNICAL FIELD

The present disclosure relates generally to communication devices having multiple antennas that support simultaneous communication channels, and more particularly to communication devices having a tactile display and multiple antennas that support simultaneous communication channels.

2. DESCRIPTION OF THE RELATED ART

Antennas are vital parts of a radio frequency (RF) front end of communication devices that communicate via wireless links. Some modern communication devices that are handheld have as many as six (6) to eight (8) antennas that need to be well tuned to maximize radio performance and enhance user experience. To accommodate the large number of antennas and avoid interference between antennas, antennas are positioned around the periphery of the communication device. In addition, certain communication devices include antennas on a back face in addition to antennas incorporated into an edge metal band of a housing assembly. When the communication device is gripped by a hand of a user, often one or more antennas are blocked or detuned resulting in degraded communication performance. To mitigate degraded performance, conventional communication devices can include an antenna switching network to switch to an unblocked antenna and/or can include an antenna tuning network to tune a degraded antenna.

Switching or tuning the antennas depends on accurately determining what antennas are affected. Conventional approaches to antenna state detection and tuning compensation includes adding multiple antenna impedance sensors and requiring increasing computational overhead, which can greatly increase the complexity and thus cost of the communication device. The large number of possible combinations of hand sizes and hand grip positions complicate these conventional approaches to antenna state detection and tuning.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3 depicts a three-dimensional front view of the example communication device of FIG. 2A in a tight, right-handed grip using a thumb and three fingers, according to one or more embodiments;

FIG. 4 depicts a back view of the example communication device of FIG. 3 being held in the tight, right-handed grip, according to one or more embodiments;

FIG. 7 depicts a front view of the example communication device of FIG. 3 being held in a tight, right-handed grip using a thumb and four fingers, according to one or more embodiments;

FIG. 8 depicts a front view of the example communication device of FIG. 3 being held in a loose, right-handed grip, according to one or more embodiments;

DETAILED DESCRIPTION

Figure 1A:
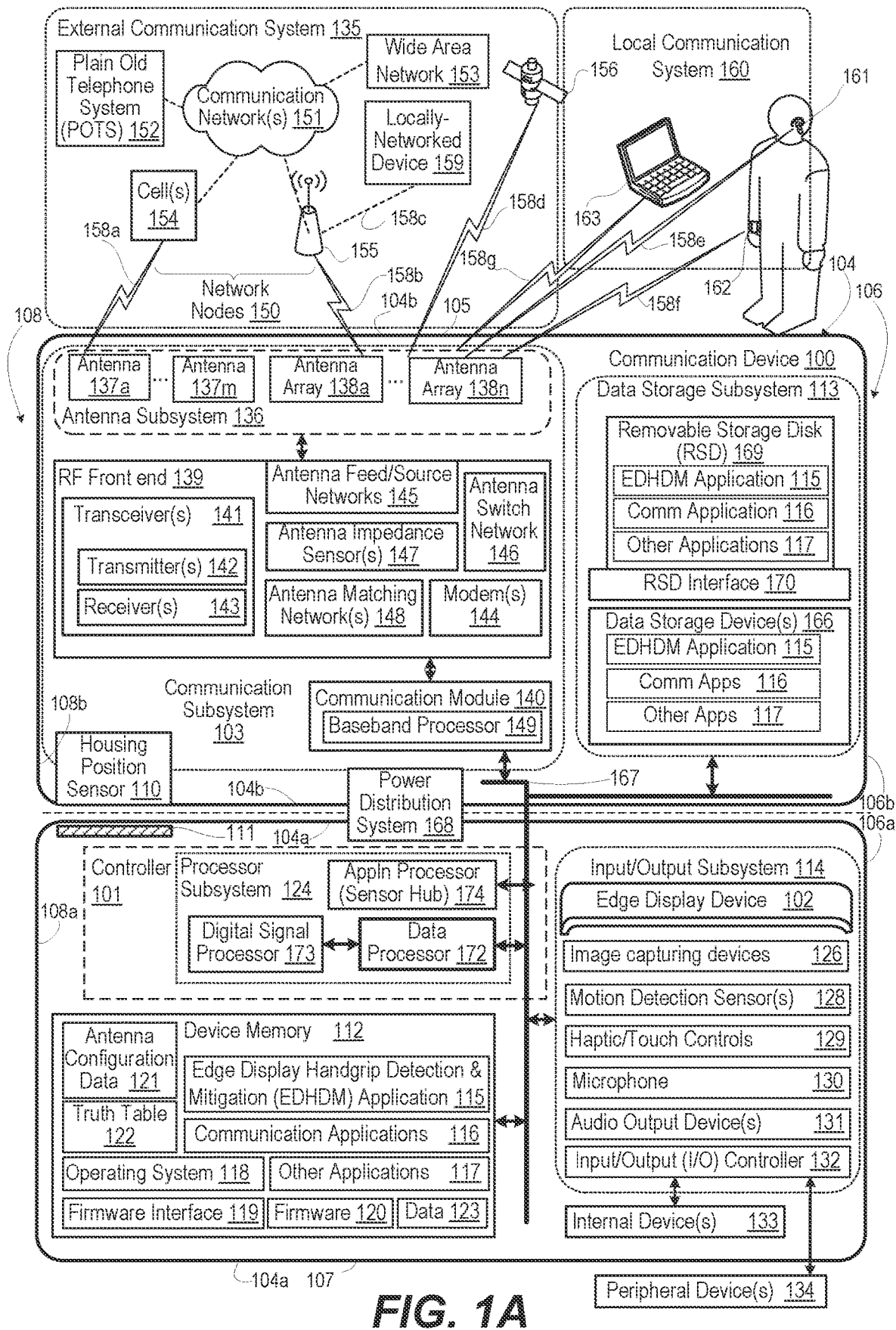
FIG. 1A depicts a functional block diagram of a communication device with multiple antennas operating in a communication environment and within which the features of the present disclosure are advantageously implemented, according to one or more embodiments.

According to aspects of the present disclosure, a communication device, a computer program product, and a method enable improved communication performance by switching or tuning antennas of the communication device based on an edge display that senses touches. Antenna switching or tuning can be performed using conventional techniques. Antenna switching includes switching a transceiver chain to an antenna capable of transceiving in the assigned communication band and that is not being touched. Antenna tuning compensates an antenna having an antenna impedance that changes (detunes) due to electromagnetic coupling to an object that is proximate to the antenna. The communication device includes a housing assembly having right and left lateral edges. At least one display device is supported by the housing assembly. The at least one display device includes right and left edge displays that are touch-sensitive. In one or more embodiments, the edge displays are touch screens that detect changes in capacitance due to touching. The right and left edge displays extend along at least a substantial portion respectively of the right and the left lateral edges.

More than one antenna is positioned along the right and left lateral edges. A radio frequency (RF) front end of the communication device includes one or more transceivers and an antenna switching and tuning network that communicatively connects the one or more transceivers to the more than one antenna. A controller of the communication device is communicatively coupled to the at least one display device and the RF front end. The controller determines portions of the left and the right edge displays that are being touched by a hand holding the communication device. The controller determines when the touches are a handgrip that affects particular antennas. The controller identifies at least one antenna that is proximate to the portions of the left and the right edge displays that are being touched. The controller configures the RF front end to switch or tune the at least one antenna in order to provide at least one of: mitigating detrimental effects to antenna performance of the at least one antenna and remaining within regulatory limits for RF transmission exposure.

According to one or more aspects of the present disclosure, antennas are present around substantially all of the top, bottom, and lateral edges of the housing assembly, increasing the likelihood that a grip of a user holding the communication device will block one or more antennas. This likelihood increases the needs for improved antenna switching and tuning. Conventional antenna tuning includes accessing antenna sensor measurements that support voltage standing wave ratio (VSWR) algorithms for detecting which antennas are adversely affected. In response, antenna tuning or switching compensates for degraded transmission and reception. Antenna tuning or switching can also be used in order to provide at least one of: mitigating detrimental effects to antenna performance of the at least one antenna and remaining within regulatory limits for RF transmission exposure. The present disclosure provides an economical and accurate approach to touch detection to replace or augment antenna impedance sensing. The present disclosure also provides closed loop control of antenna switching for antennas that cannot be feasibly monitored using impedance sensors. For example, certain antennas may be used solely for receiving. The present disclosure can detect touching without having to add transmit ability to the receive-only antennas, as required for impedance sensing.

According to one or more aspects of the present disclosure, using edge displays to detect hand position has a particular benefit to receive-only antennas such as Wi-Fi/GPS antennas for which impedance measurement is not available or to transmit antennas for which impedance measurement is not practical. Edge displays provide high resolution detection of handgrip locations on edges of the housing assembly, even for a light grip that provides a poor capacitive change for a capacitive sensor. By incorporating geometric recognition patterns for both right and left-handed grips of hands of different sizes, proximity to antennas can be robustly detected, even for antennas on the back of the housing assembly. Detecting user interaction with a communication device and associating different tune states for each interaction improves the overall performance of the antennas.

In one or more embodiments, the present disclosure provides for detecting a thumb finger on one lateral edge to easily determine the left or right handgrip. Also, the location of the thumb can provide a fair estimate of hand size and form of the grip. As an example, if the thumb finger is on the right edge and below or above the center of the display, two different tuning states can be chosen. Directly or indirectly detecting portions of the hand to include palm and index finger can detect proximity to antennas along the edge and the back of the communication device, eliminating detection ambiguities. The present disclosure facilitates closed loop tuning of affected antennas or switching to unaffected antenna. In one or more embodiments, edge detection can detect user contact on one or more of the top, right, bottom, and left edges of the communication device that would affect antennas. Hand grip states can be directly mapped to antenna tuning and switching states.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1A is a functional block diagram of an electronic device, and more particularly communication device 100, which is managed by controller 101, in an operating environment within which the features of the present disclosure are advantageously implemented. Controller 101 monitors and responds to peripheral touches detected by edge display device 102 to improve communication performance by communication subsystem 103. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Communication device 100 includes housing assembly 104 that either has a unitary "candy bar" form factor or a configurable "flip" form factor.

Figure 1B:
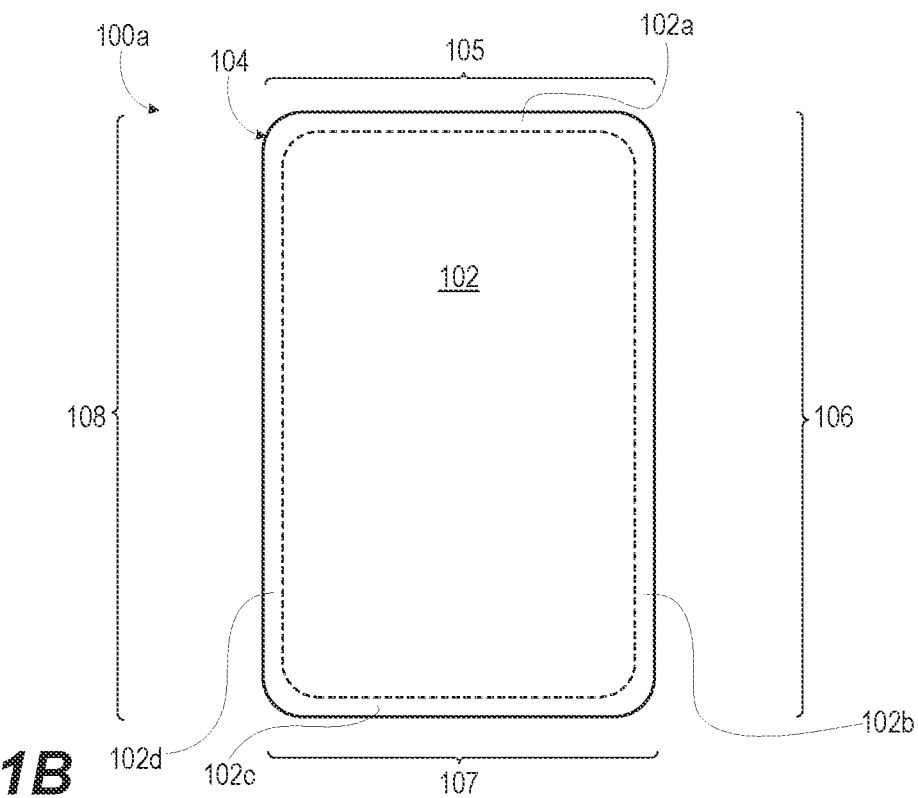
FIG. 1B depicts a three-dimensional view of the example communication device having a unitary housing, according to one or more embodiments.

Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100). FIG. 1B depicts a three-dimensional view of communication device 100a that includes housing assembly 104 having the unitary "candy bar" form factor. Housing assembly 104 has top edge 105, right edge 106, bottom edge 107, and left edge 108. Edge display device 102 provides top, right, bottom, and left edges displays 102a-102d that are touch sensitive.

Figure 1C:
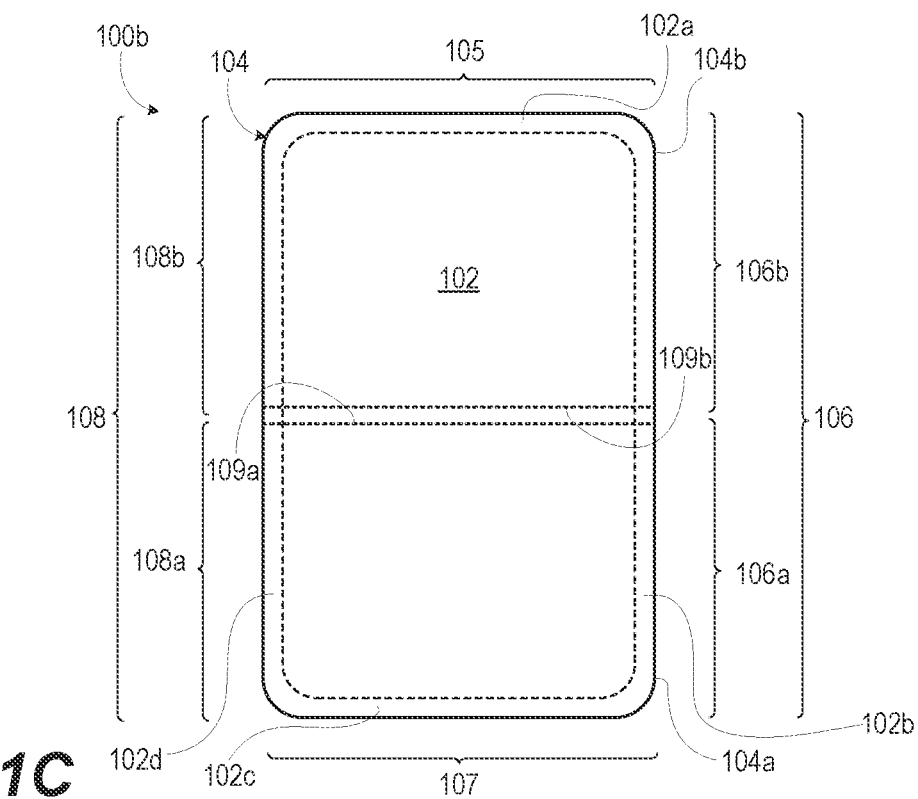
FIG. 1C depicts a three-dimensional view of the example communication device having a configurable housing assembly, according to one or more embodiments.

FIG. 1C depicts a three-dimensional view of communication device 100b that includes housing assembly 104 that has a configurable "flip phone" form factor. Housing assembly 104 has top edge 105, right edge 106, bottom edge 107, and left edge 108. Edge display device 102 provides top, right, bottom, and left edges displays 102a-102d that are touch sensitive. Housing assembly 104 is configurable, having at least first and second housing portions 104a-104b that are connected at respective first and second proximal sides 109a-109b for relative movement between an open position and a closed position. In one or more embodiments, first and second housing portions 104a-104b are respectively a base and a flip portion of housing assembly 104. Top edge 105 is a distal side of second housing portion 104b. Right edge 106 include lower right edge portion 106a of first housing portion 104a and upper right edge portion 106b of second housing portion 104b. Bottom edge 107 is a distal edge of first housing portion 104a. Left edge 108 includes lower left edge portion 108a of first housing portion 104a and upper left edge portion 108b of second housing portion 104b.

Referring again to the specific component makeup and the associated functionality of communication device 100 of FIG. 1A. Controller 101 is communicatively coupled to housing position sensor 110 that detects when housing assembly 104 is in: (i) a closed position; and (ii) at least a partially open position or a fully open position. Controller 101 configures communication subsystem 103 based at least in part on the position of housing assembly 104. Housing position sensor 110 can be one of: (i) a two binary positions switch which detects the closed position and any other position considered partially open position (i.e., not a closed position); (ii) a multiple position switch of discrete values; or (iii) a continuous range sensor. The at least partially open position of housing assembly 104 can be one or more positions between 1° and 179° defined as pivot angles between first and second housing portions 103a-103b. With each implementation, housing position sensor 110 detects the partially open position based on the two housing portions being a predetermined distance or number of degrees apart from each other (e.g., at 30° or 45°). The distance or number of degrees can be empirically determined to correspond with when the antennas are sufficiently apart for a particular operational mode of communication device 100. As an example, the defined pivot angles can be based on one or more considerations such as: (i) capabilities of housing position sensor 110; (ii) mechanically available positions of housing assembly 104; (iii) usability of user interface components; and (iv) spatial coverage of antennas 137a-137d as a function of pivot angle. As one example, housing assembly 104 can have a pivot mechanism that is stable in three positions: (i) fully closed; (ii) open 90°; and (iii) fully open. At least partially open position can be based on a pivot position of at least 45° that corresponds to activating a front display device in preparation for viewing at 90° or fully open. As another example, certain pivot positions affect ability to communicate in certain spatial directions. detecting one or more positions of housing assembly 104 can be used to select antennas 137a-137d for spatial diversity. Housing position sensor 110 can detect a particular amount of pivoting from the closed position to the partially open position that is sufficient for a change in an operational characteristic of communication device 100b. For example, the partially open position can be sufficient for viewing edge display device 102, prompting controller 101 to activate edge display device 102. For another example, the partially open position can be sufficient for two or more antennas that are respectively on first and second housing portions 104a-104b to sufficiently separated for independent operation without impairing antenna efficiency. The partially open position can be substantially the same as the fully open position with regard to antenna operation.

In one or more embodiments, communication device 100 includes device memory 112, communication subsystem 103, data storage subsystem 113, and input/output (I/O) subsystem 114. Device memory 112 and each subsystem (103, 113, and 114) are managed by controller 101. Device memory 112 includes program code and applications such as antenna control application 115, communication applications 116, and other application(s) 117 that use communication services. Device memory 112 further includes operating system (OS) 118, firmware interface 119, such as basic input/output system (BIOS) or Uniform Extensible Firmware Interface (UEFI), and firmware 120. Device memory 112 includes antenna configuration data 121, antenna tuning truth table 122, or other computer data 123 used by antenna control application 115.

Processor subsystem 124 of controller 101 executes program code to provide operating functionality of communication device 100. The software and/or firmware modules have varying functionality when their corresponding program code is executed by processor subsystem 124 or secondary processing devices within communication device 100. Processor subsystem 124 of controller 101 can execute program code of antenna control application 115 to configure communication subsystem 103.

I/O subsystem 114 includes image capturing device(s) 126. I/O subsystem 114 includes user interface devices such as edge display device 102, motion detection sensors 128, touch/haptic controls 129, microphone 130, and audio output device(s) 131. I/O subsystem 114 also includes I/O controller 132. In one or more embodiments, motion detection sensors 128 can detect an orientation and movement of the communication device 100 that indicates that the communication device 100 should activate edge display device 102 or should vertically reorient visual content presented on edge display device 102. In one or more embodiments, motion detection sensors 128 are used for functions other than user inputs, such as detecting an impending ground impact. I/O controller 132 connects to internal devices 133, which are internal to housing assembly 104 and to peripheral devices 134, such as external speakers, which are external to housing assembly 104 of communication device 100. Examples of internal devices 133 are computing, storage, communication, or sensing components depicted within housing assembly 104. I/O controller 132 supports the necessary configuration of connectors, electrical power, communication protocols, and data buffering to act as an interface to internal devices 133 and peripheral devices 134 to other components of communication device 100 that use a different configuration for inputs and outputs.

Communication sub system 103 of communication device 100 enables wireless communication with external communication system 135. Communication sub system 103 includes antenna subsystem 136 having lower band antennas 137a-137m and higher band antenna array modules 138a-138n that can be attached in/at different portions of housing assembly 104. Communication subsystem 103 includes radio frequency (RF) front end 139 and communication module 140. RF front end 139 includes transceiver(s) 141, which includes transmitter(s) 142 and receiver(s) 143. RF front end 139 further includes modem(s) 144. RF front end 139 includes antenna feed/source networks 145, antenna switch network 146, antenna impedance sensor(s) 147, and antenna matching network(s) 148. Communication module 140 of communication subsystem 103 includes baseband processor 149 that communicates with controller 101 and RF front end 139. Baseband processor 149 operates in baseband frequency range to encode data for transmission and decode received data, according to a communication protocol. Modem(s) 144 modulate baseband encoded data from communication module 140 onto a carrier signal to provide a transmit signal that is amplified by transmitter(s) 142. Modem(s) 144 demodulates each signal received from external communication system 135 detected by antenna subsystem 136. The received signal is amplified and filtered by receiver(s) 143, which demodulate received encoded data from a received carrier signal. Antenna feed/source networks 145 transmits or receives from particular portions of antenna subsystem 136 and can adjust phase between particular portions of antenna subsystem 136. Antenna switch network 146 can connect particular combinations of antennas (137a-137m, 138a-138n) to transceiver(s) 141. Controller 101 can monitor changes in antenna impedance detected by antenna impedance sensor(s) 147 for determining portions of antenna subsystem 136 that are blocked. Antenna matching network(s) 148 are connected to particular lower band antennas 137a-137m to tune impedance respectively of lower band antennas 137a-137m to match impedance of transceivers 141. Antenna matching network(s) 148 can also be used to detune the impedance of lower band antennas 137a-137m to not match the impedance of transceivers 141 to electromagnetically isolate a particular antenna.

In one or more embodiments, controller 101, via communication subsystem 103, performs multiple types of over-the-air (OTA) communication with network nodes 150 of external communication system 135. Particular network nodes 150 can be part of communication networks 151 of public land mobile networks (PLMNs) that provide connections to plain old telephone systems (POTS) 152 for voice calls and wide area networks (WANs) 153 for data sessions. WANs 153 can include Internet and other data networks. The particular network nodes 150 can be cells 154 such as provided by base stations or base nodes that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas 137a-137m are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 150 can be access node(s) 155 that support wireless OTA communication. Communication subsystem 103 can receive OTA communication from location services such as provided by global positioning system (GPS) satellites 156. Communication subsystem 103 communicates via OTA communication channel(s) 158a with cells 154. Communication subsystem 103 communicates via wireless communication channel(s) 158b with access node 155. In one or more particular embodiments, access node 155 supports communication using one or more IEEE 802.11 wireless local area network (WLAN) protocols. Wi-Fi is a family of wireless network protocols, based on the IEEE 802.11 family of standards, which are commonly used between user devices and network devices that provide Internet access. For example, Wi-Fi 6e standard is a new requirement which extends the upper Wi-Fi frequency range to 7.1 GHz. Wi-Fi 6e is in addition to prior versions of Wi-Fi antennas covering 2.3-2.4 and 5.0-6.0 GHz. In one or more particular embodiments, communication subsystem 103 communicates with one or more locally networked devices 159 via wired or wireless link 158c provided by access node 155. Communication subsystem 103 receives downlink broadcast channel(s) 158d from GPS satellites 156 to obtain geospatial location information.

In one or more embodiments, controller 101, via communication subsystem 103, performs multiple types of OTA communication with local communication system 160. In one or more embodiments, local communication system 160 includes wireless headset 161 and smart watch 162 that are coupled to communication device 100 to form a personal access network (PAN). Communication subsystem 103 communicates via low power wireless communication channel(s) 158e with headset 161. Communication subsystem 103 communicates via second low power wireless communication channel(s) 158f, such as Bluetooth, with smart watch 162. In one or more particular embodiments, communication subsystem 103 communicates with other communication device(s) 163 via wireless link 158g to form an ad hoc network.

Data storage subsystem 113 of communication device 100 includes data storage device(s) 166. Controller 101 is communicatively connected, via system interlink 167, to data storage device(s) 166. Data storage subsystem 113 provides applications, program code, and stored data on nonvolatile storage that is accessible by controller 101. For example, data storage subsystem 113 can provide a selection of program code and applications such as antenna control application 115, location service applications 116, and other application(s) 117 that use communication services. These applications can be loaded into device memory 112 for execution by controller 101. In one or more embodiments, data storage device(s) 166 can include hard disk drives (HDDs), optical disk drives, and/or solid-state drives (SSDs), etc. Data storage subsystem 113 of communication device 100 can include removable storage device(s) (RSD(s)) 169, which is received in RSD interface 170. Controller 101 is communicatively connected to RSD 169, via system interlink 167 and RSD interface 170. In one or more embodiments, RSD 169 is a non-transitory computer program product or computer readable storage device. Controller 101 can access RSD 169 or data storage device(s) 166 to provision communication device 100 with program code, such as antenna control application 115 and other applications 117. When executed by controller 101, the program code causes or configures communication device 100 to provide the multi-transceiver operational functionality using a configurable housing assembly 104 described herein.

Controller 101 includes processor subsystem 124, which includes one or more central processing units (CPUs), depicted as data processor 172. Processor subsystem 124 can include one or more digital signal processors 173 that are integrated with data processor 172 or are communicatively coupled to data processor 172, such as baseband processor 149 of communication module 140. Controller 101 can include one or more application processor(s) ("sensor hub") 174 to monitor sensors or controls such as housing position sensor 110 and antenna switch network 146. In one or embodiments that are not depicted, controller 101 can further include distributed processing and control components that are peripheral or remote to housing assembly 104 or grouped with other components, such as I/O subsystem 114. Data processor 172 is communicatively coupled, via system interlink 167, to device memory 112. In one or more embodiments, controller 101 of communication device 100 is communicatively coupled via system interlink 167 to communication subsystem 103, data storage subsystem 113, and input/output subsystem 114. System interlink 167 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 167) are illustrated in FIG. 1A, it is to be understood that more, fewer, or different interconnections may be present in other embodiments. Interlink 167 communicatively connects components in first housing portion 103a to components in second housing portion 103b. Power distribution subsystem 168 provides electrical power to components in first housing portion 103a and to components in second housing portion 103b.

Controller 101 manages, and in some instances directly controls, the various functions and/or operations of communication device 100. These functions and/or operations include, but are not limited to including, application data processing, communication with other communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Figure 1D:
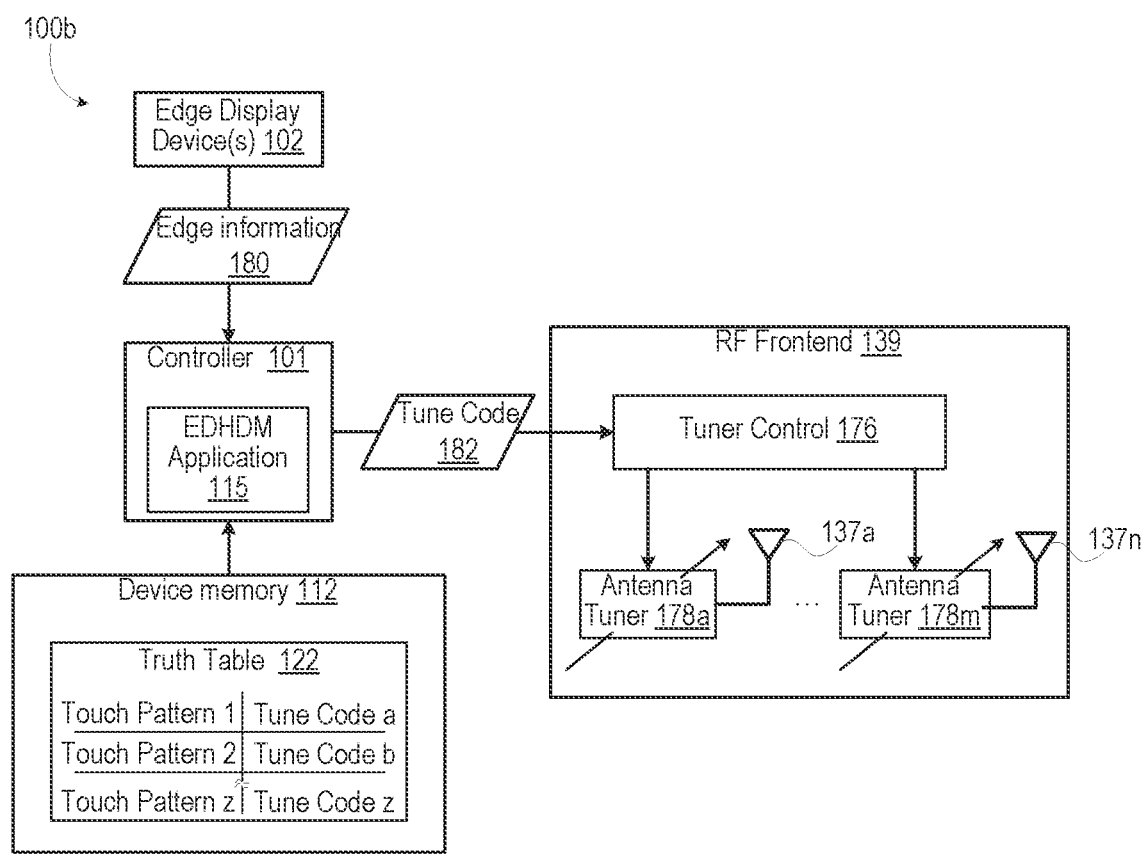
FIG. 1D depicts a simplified communication diagram of components of the communication device of FIG. 1A that tunes antennas based on edge detection, according to one or more embodiments.

FIG. 1D depicts a simplified communication diagram of components of communication device 100 that tunes antennas 137a-137m based on edge detection. In one or more embodiments, RF frontend 139 includes tuner control 176 that is communicatively coupled to control antenna tuners 178a-178m that respectively tune antenna 137a-137m. According to one or more embodiments, edge display handgrip detection and mitigation (EDHDM) application 115, when executed by processor subsystem 124 (FIG. 1A) of controller 101, can use truth table 122 122 for tuning antennas 137a-137m. Edge display device(s) 102 provide edge information 180 to EDHDM application 115 executed by controller 124. Based on detected handgrip pattern, EDHDM application 115 determines a corresponding tune code 182 stored in truth table 122 in device memory 112. Controller 101 configures tuner control 176 with tune code 182.

Figure 2A:
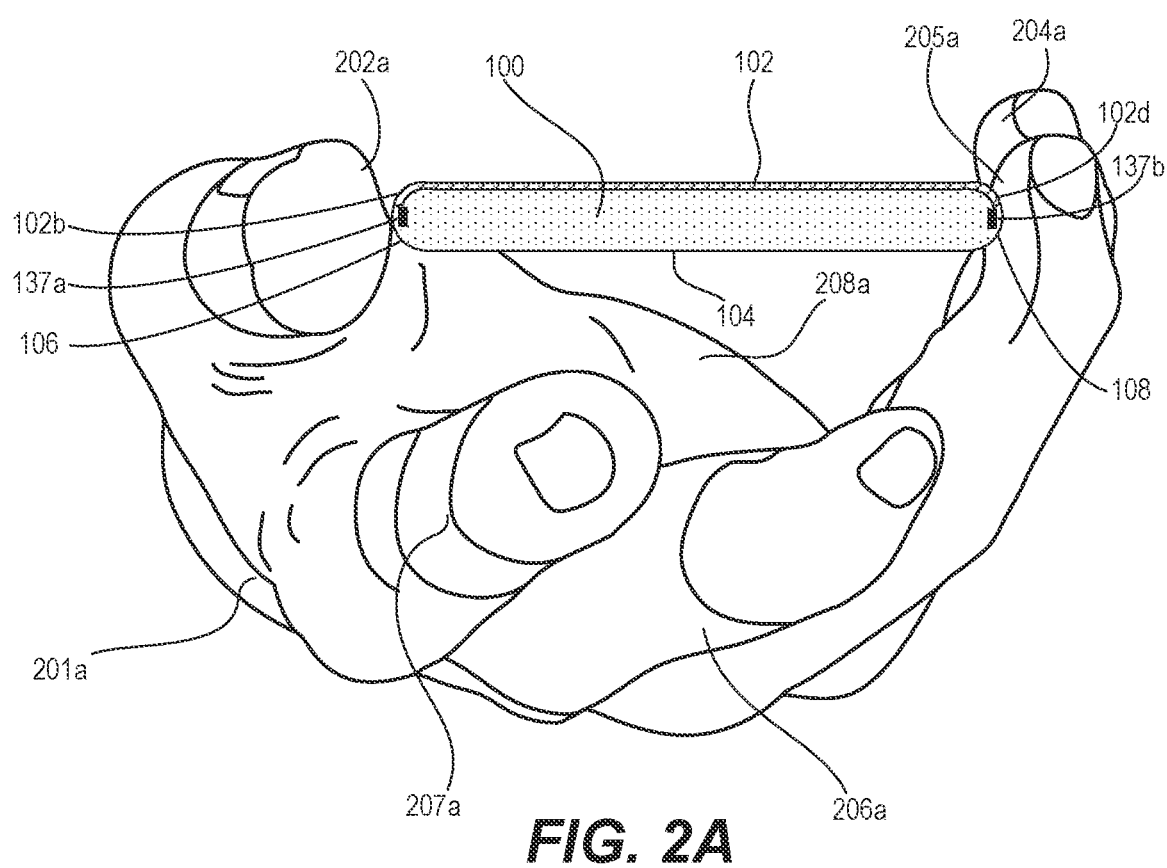
FIG. 2A depicts an end view of an example communication device having an edge display device that is gripped by a user, according to one or more embodiments.

FIG. 2A depicts an end view of example communication device 100 having edge display device 102 that is gripped by right hand 201a of a user. Thumb 202a touches right edge 106 of housing assembly 104 and right edge display 102b of edge display device 102. At least pinky and ring fingers 204a-205a touch left edge 108 of housing assembly 104 and left edge display 102d of edge display device 102. In one or more scenarios, middle finger 206a, index finger 207a, and/or palm 208a can also contact edge display device 102. Thumb 202a is proximate to antenna 137a, and ring finger 205a is proximate to antenna 137b, both of which affects antenna performance. Human tissue is a lossy dielectric that absorbs RF transmissions as well as affecting impedance of antennas 137a-137b. Mismatched impedance between antennas 137a-137b and RF front end 139 (FIG. 1A) reduces antenna performance.

Figure 2B:
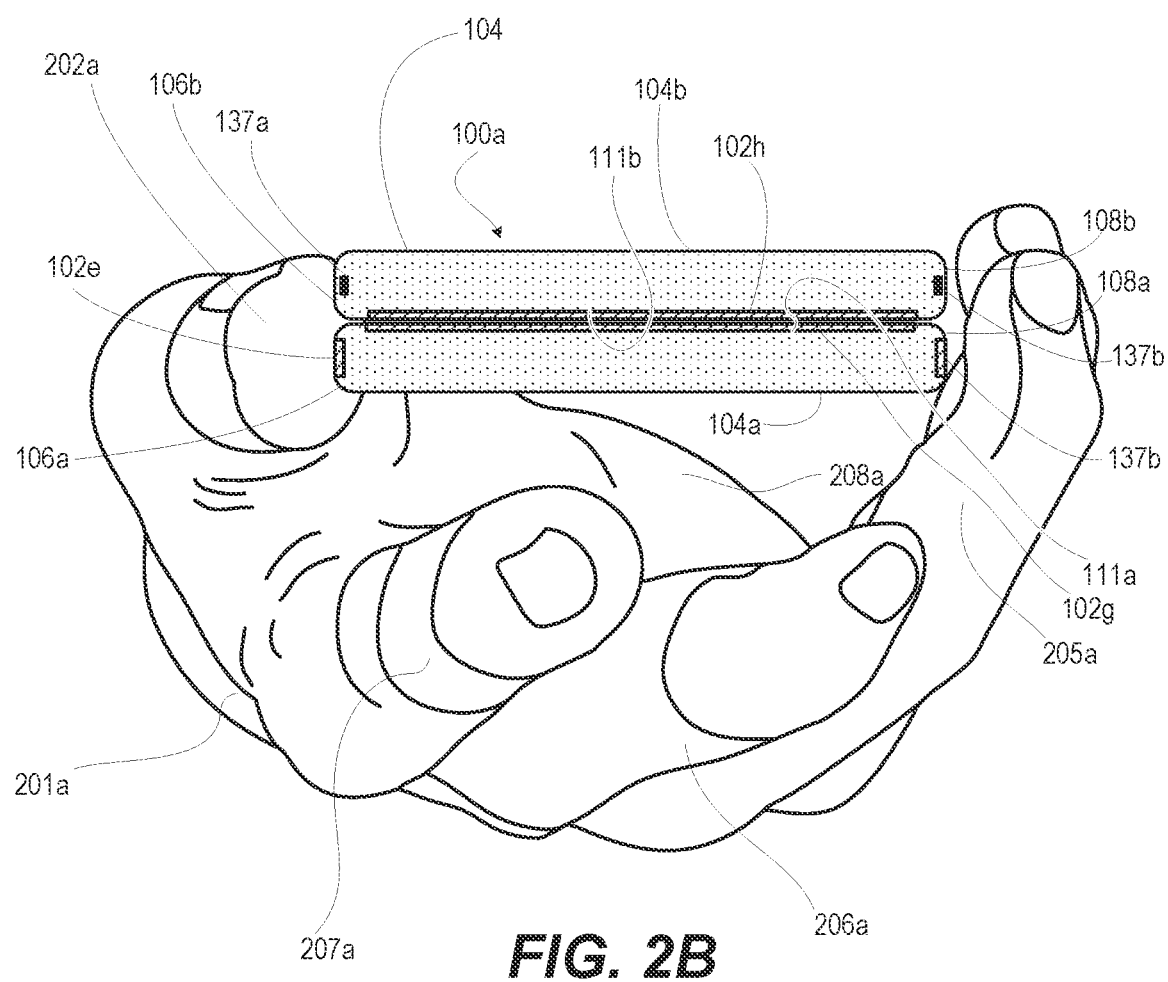
FIG. 2B depicts an end view of an example communication device having a configurable housing in a closed position, with edge display devices that are in contact with the hand of a user holding the device, according to one or more embodiments.
Figure 2C:
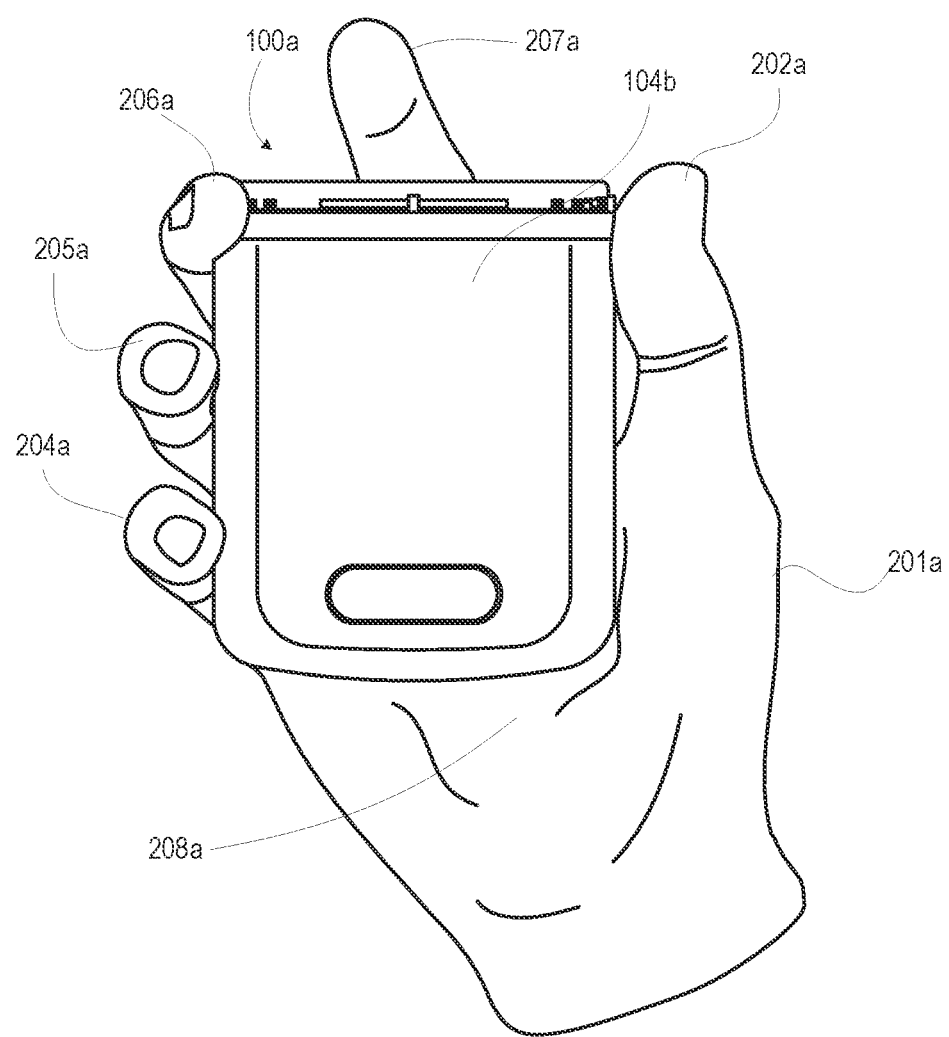
FIG. 2C depicts a front view of the example communication device of FIG. 2B that is gripped by the user, according to one or more embodiments.

FIG. 2B depicts an end view of an example communication device 100a having configurable housing assembly 104 in a closed position and held by right hand 201a of a user. FIG. 2C depicts a front view of example communication device 100a of FIG. 2B that is held by right hand 201a of the user. With particular reference to FIG. 2B, communication device 100a includes right and left edge display devices 102e-102f that are positioned respectively on right and left edges 106a, 108a of first housing portion 104a. Edge display devices 102b, 102d are visible and can be activated when housing assembly 104 is in the closed position. Lower display device 102g is positioned at front face 111a of first housing portion 104a. Upper display device 102h is positioned at front face 111b of second housing portion 104b. Lower and upper display devices 102g-102h are hidden and can be inactive when housing assembly 104 is in the closed position. Antennas 137a-137b are respectively at right and left edges 106b, 108b of second housing portion 104b. At least pinky and ring fingers 204a-205a touch left edges 108a-108b of housing assembly 104 and left edge display 102d of edge display device 102d. In one or more scenarios, middle finger 206a, index finger 207a, and/or palm 208a can also contact edge display device 102d. Thumb 202a is proximate to antenna 137a, and ring finger 205a is proximate to antenna 137b, both of which affect antenna performance. The described features of the disclosure, including the antenna tuning and switching features, also apply to communication device 100a when housing assembly 104 is in the closed position, where edge display devices 102e-102f are physically impacted by and thus detect the presence of sections of the user's hand 201a holding communication device 100a.

FIG. 3 depicts a front three-dimensional view of example communication device 100 in a tight, right-handed grip. FIG. 4 depicts a back view of example communication device 100 of FIG. 3 in the tight, right-handed grip. With particular reference to FIG. 3, the grip can be deemed tight based on having detected touches higher up on communication device 100, such as above central pixel reference line 301 and/or detecting touch by palm 208a. In one or more of the described embodiments, the hand grip can be deemed loose based on having detected touches lower down on the communication device 100 and/or not detecting touch by palm 208a. Communication device 100 uses longitudinal distances of detected touch(es) on right edge display 102b from a central pixel reference line 301 to estimate hand size. Communication device 100 detects thumb 202a of right hand 201a contacting first edge area 311 above central pixel reference line 301. Performance of antennas 137a-137m (FIG. 1A) in first edge area 311 can be adversely affected. Communication device 100 detects palm 208a against at least right edge display 102b at second edge area 312. Communication device 100 detects pinky finger 204a and ring finger 205a against left edge display 102d at third edge area 313 below central pixel reference line 301. Communication device 100 detects middle finger 206a against left edge display 102d at fourth edge area 314 above central pixel reference line 301. Based on the detected touch pattern, communication device 100 recognizes a right-handed grip. With particular reference to FIG. 4, communication device 100 recognizes that index finger 207a is not touching left edge display 102d. Communication device 100 can indirectly detect that index finger 207a is touching fifth touch area 415 proximate to back antenna 137a.

Figure 5:
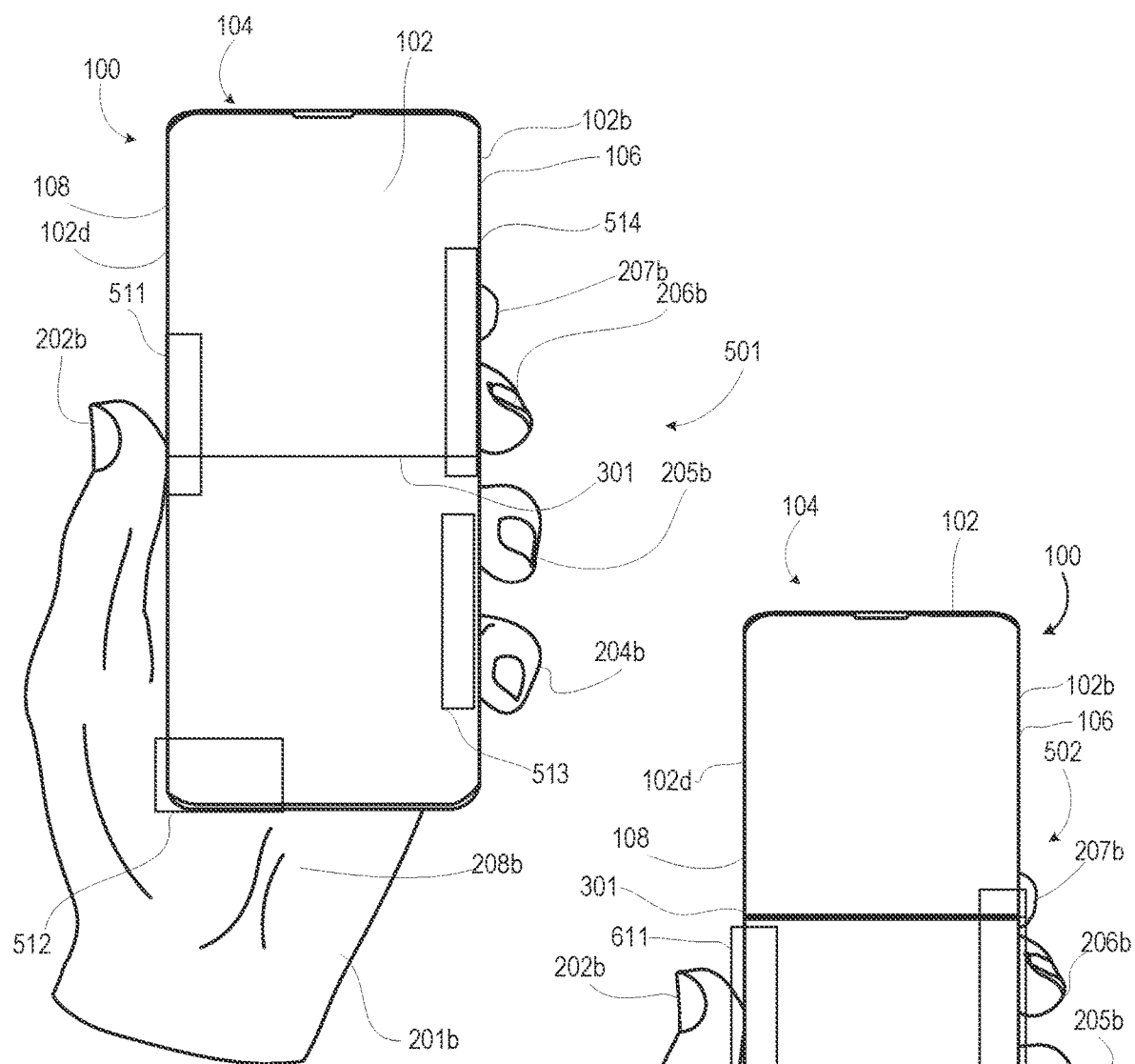
FIG. 5 depicts a front view of the example communication device of FIG. 3 being held in a tight, left-handed grip, according to one or more embodiments.

In one or more embodiments, communication device 100 detects at least four particular handgrip states 501-504 depicted respectively in FIGS. 5-8. Each handgrip state corresponds to defined antenna switching and tuning configurations. FIG. 5 depicts a front view of example communication device 100 in first handgrip state 501 of a tight, left-handed grip by left hand 201b. Communication device 100 detects thumb 202b of left hand 201b contacting first edge area 511 on central pixel reference line 301. Communication device 100 detects palm 208b against at least left edge display 102d at second edge area 512. Communication device 100 detects pinky finger 204b and ring finger 205b against right edge display 102b at third edge area 513 below central pixel reference line 301. Communication device 100 detects middle finger 206b and index finger 106b against right edge display 102b at fourth edge area 514 above central pixel reference line 301.

Figure 6:
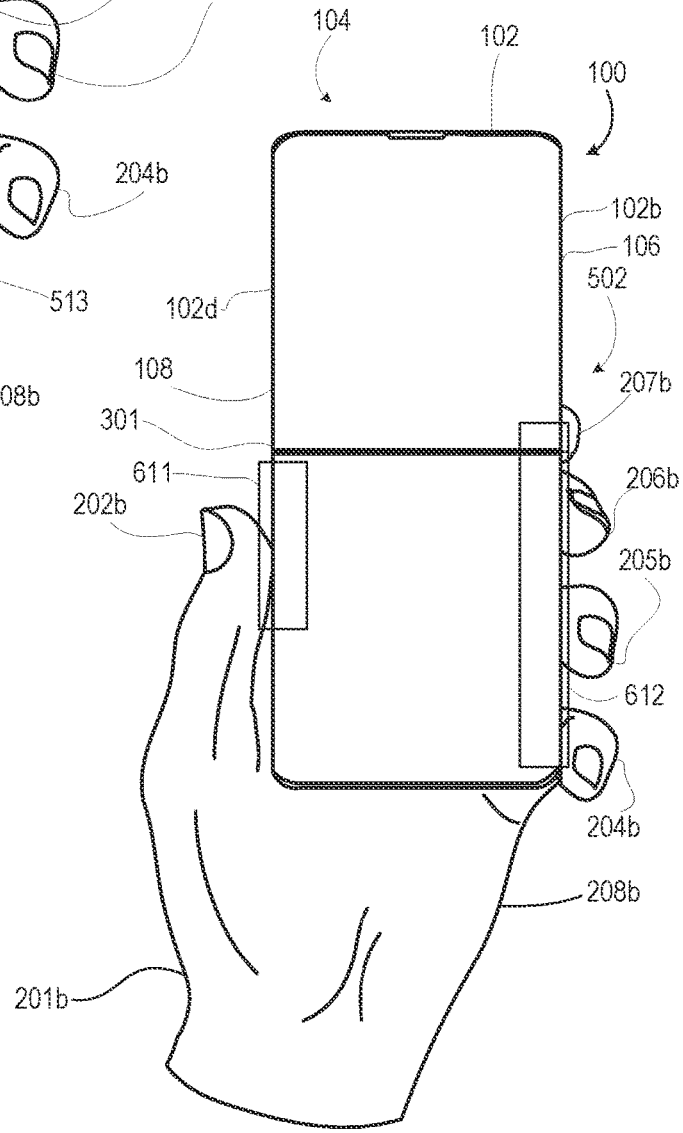
FIG. 6 depicts a front view of the example communication device of FIG. 3 being held in a loose, left-handed grip, according to one or more embodiments.

FIG. 6 depicts a front view of example communication device 100 in second handgrip state 502 of a loose, left-handed grip by left hand 201b. According to the disclosure, and as presented by one or more embodiments, references to a loose grip correlates to the device detecting the hand holding a portion of communication device 100, without device contact with palm 208b. In contrast, a tight grip correlates with the device detecting the palm and fingers all contacting communication device 100. Communication device 100 detects thumb 202b of hand 201b contacting against left edge display 102d at first edge area 611 below central pixel reference line 301. Communication device 100 does not detect palm 208b. Communication device 100 detects pinky finger 204b, ring finger 205b, middle finger 206b and index finger 106b against right edge display 102b in second touch area 612 below central pixel reference line 301.

FIG. 7 depicts a front view of the example communication device 100 in third handgrip state 503 of a tight, right-handed grip in right hand 201a. Communication device 100 detects thumb 202a of right hand 201a against right edge display 102b at central pixel reference line 301. Communication device 100 detects palm 208a against at least right edge display 102b. Communication device 100 detects pinky finger 204a and ring finger 205a against left edge display 102d below central pixel reference line 301. Communication device 100 detects middle finger 206a and index finger 106a against left edge display 102d above central pixel reference line 301. FIG. 8 depicts a front view of the example communication device 100 in fourth handgrip state 504 of a loose, right-handed grip in right hand 201a. Communication device 100 detects thumb 202a of hand 201a against right edge display 102b below central pixel reference line 301. Communication device 100 does not detect palm 208a. Communication device 100 detects pinky finger 204a, ring finger 205a, middle finger 206a and index finger 106a against left edge display 102d below central pixel reference line 301. In one or more embodiments, communication device 100 can recognize a right and a left handgrip as well as loose or tight handgrips based on different subsets of detected fingers 204a-207a or 204b-207b. As an example, communication device 100 detects fingers 204a-207a in FIGS. 7-8. Communication device 100 detects fingers 204a-206a in FIGS. 3-4 as a particular variation of third handgrip state 503 (FIG. 7).

Figure 9A:
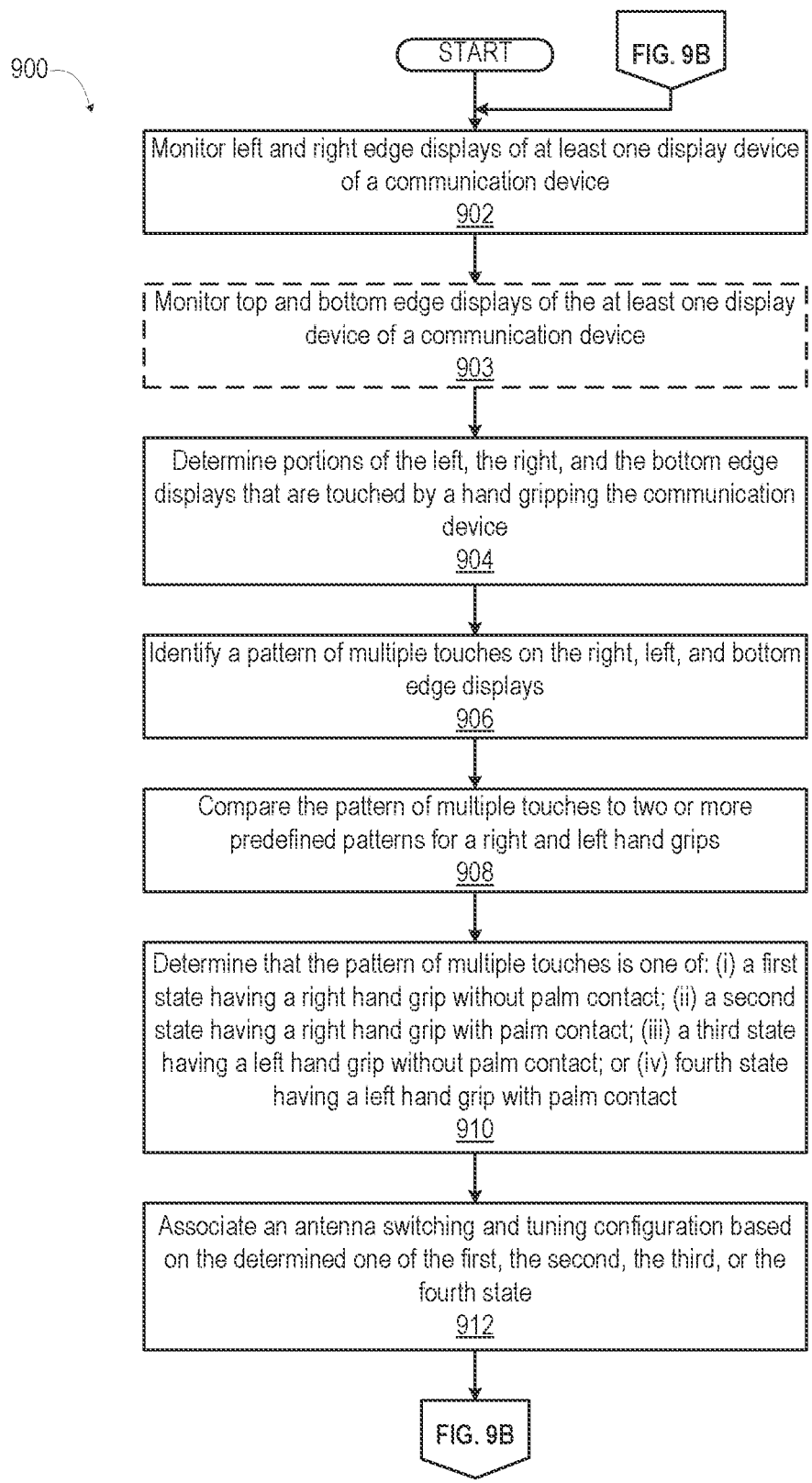
FIGS. 9A-9B (FIG. 9) present a flow diagram of a method for improved communication performance by switching or tuning antennas based on one or more edge display(s) detecting a handgrip that affects particular antennas, according to one or more embodiments.
Figure 9B:
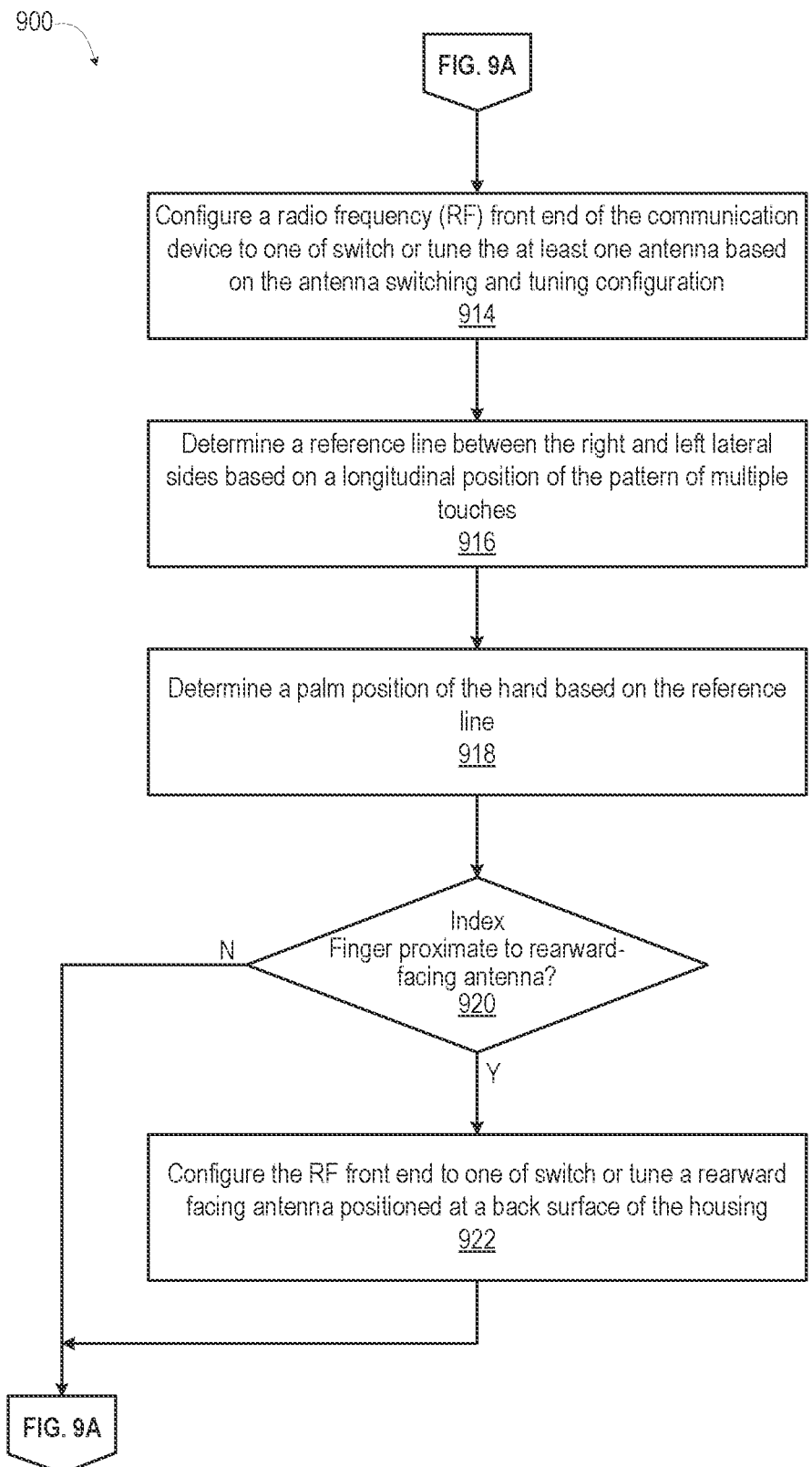

FIGS. 9A-9B (FIG. 9) present a flow diagram of method 900 for improved communication performance by switching or tuning antennas based on detecting edge display(s) detecting a handgrip that affects particular antennas. The description of method 900 is provided with general reference to the specific components illustrated within the preceding FIGS. 1A-1C and 2 8. In at least one embodiment, communication device 100, managed by controller 101, performs method 900 by detecting a handgrip state using edge display device 102 (FIG. 1A) and configuring RF front end 139 to mitigate for the detected handgrip state. Controller 101 executes EDHDM application 115 (FIG. 1A) to provide the multiple transceiver communication functionality of method 900. Specific components described in method 900 can be identical or similar to components of the same name used to describe preceding FIGS. 1A-1B and 2 8. With reference to FIG. 9A, method 900 includes monitoring left and right edge displays of at least one display device of a communication device (block 902). In one or more embodiments, method 900 includes additionally monitoring one or more of top and bottom edge display of the at least one display device (block 903). The left, right, and bottom edge displays extend along at least a substantial portion respectively of right and left lateral edges and a bottom edge of a housing assembly of the communication device. Method 900 includes determining portions of the left, the right, and the bottom edge displays that are touched by a hand gripping the communication device (block 904). Method 900 includes identifying a pattern of multiple touches on the right, left, and bottom edge displays (block 906). Method 900 includes comparing the pattern of multiple touches to two or more predefined patterns for right-handed and left-handed grips (block 908). In one or more embodiments, method 900 includes determining that the pattern of multiple touches is one of: (i) a first state having a right-handed grip without palm contact; (ii) a second state having a right-handed grip with palm contact; (iii) a third state having a left-handed grip without palm contact; or (iv) fourth state having a left-handed grip with palm contact (block 916). In one or more embodiments, method 900 includes recognizing right handgrip from left handgrip by detecting two or more touches on one lateral side and one touch on the other lateral side. In one or more embodiments method 900 includes recognizing a tight handgrip from a loose handgrip by determining respectively higher or lower touches on communication device. Method 900 includes associating an antenna switching and tuning configuration based on the determined one of the first, the second, the third, or the fourth state (block 912).

With reference to FIG. 9B, method 900 includes configuring a radio frequency (RF) front end of the communication device to one of switch or tune the at least one antenna based on the antenna switching and tuning configuration (block 914). In one or more embodiments, method 900 includes determining a reference line between the right and left lateral sides based on a longitudinal position of the pattern of multiple touches (block 916). Method 900 includes determining a palm position of the hand based on the reference line (block 918). Method 900 includes determining whether the pattern of multiple touches indicates that an index finger of the hand is positioned proximate to the rearward facing antenna (decision block 920). In response to determining that the index finger is positioned proximate to the rearward facing antenna, method 900 includes configuring the RF front end to one of switch or tune a rearward facing antenna positioned at a back surface of the housing assembly (block 922). In response to determining that the index finger is not positioned proximate to the rearward facing antenna or after block 922, method 900 returns to block 902 (FIG. 9A).

Figure 10:
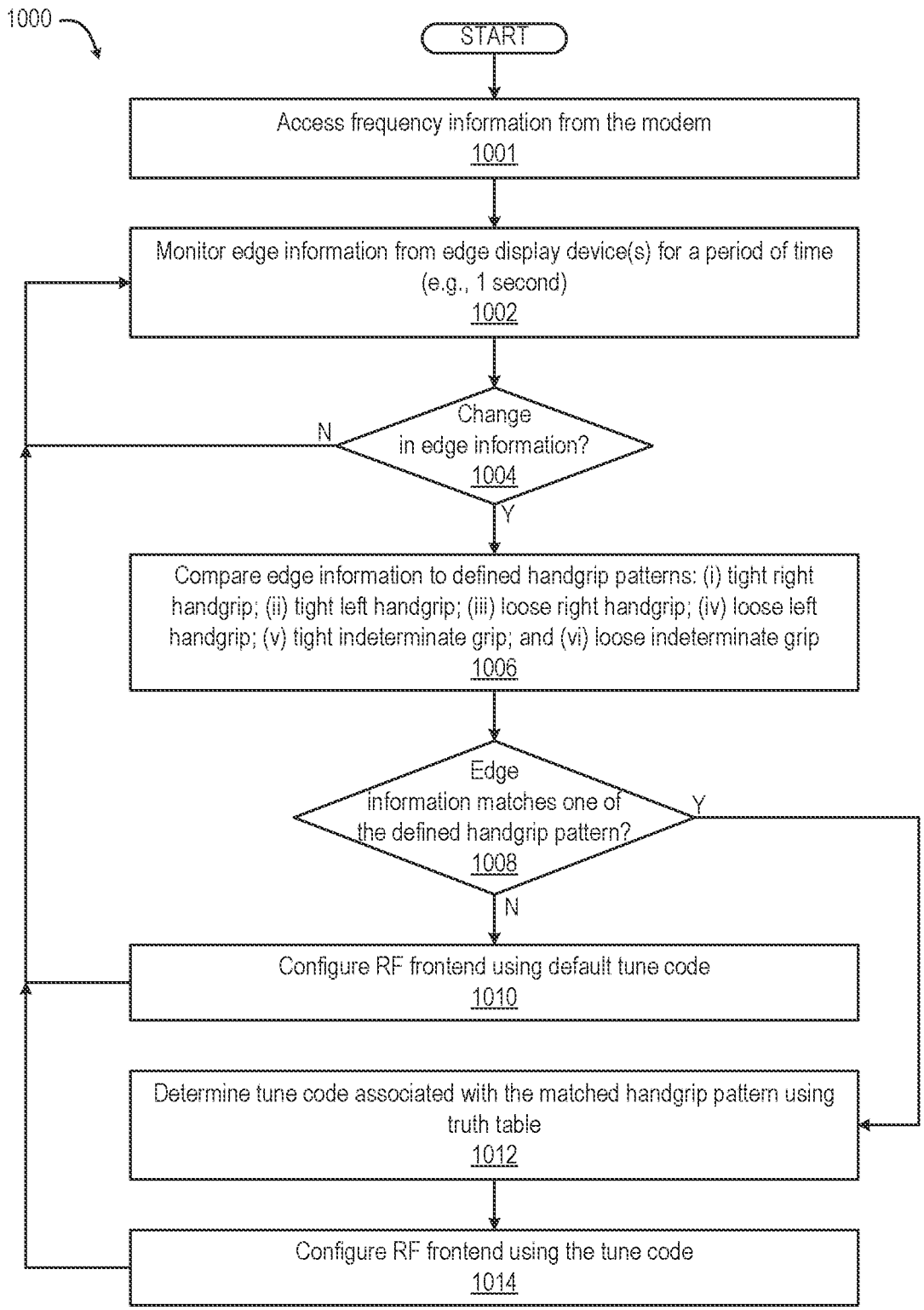
FIG. 10 presents a flow diagram of a method for determining a tune code for configuring a radio frequency (RF) frontend based on edge information, according to one or more embodiments.

FIG. 10 presents a flow diagram of method 1000 for determining a tune code for configuring an RF frontend based on edge information. The description of method 1000 is provided with general reference to the specific components illustrated within the preceding FIGS. 1A-1C, 2 8, and 9A-9B. In at least one embodiment, communication device 100, managed by controller 101, performs method 1000 by detecting a handgrip state using edge display device 102 (FIG. 1A) and configuring RF front end 139 to mitigate for the detected handgrip state. Controller 101 executes EDHDM application 115 (FIG. 1A) to provide the multiple transceiver communication functionality of method 1000. Specific components described in method 1000 can be identical or similar to components of the same name used to describe preceding FIGS. 1A-1C, 2 8, and 9A-9B. Method 1000 includes monitoring edge information received from edge display device(s) over a period of time (e.g., 1 second) (block 1002). The period of time can be selected to be sufficiently long to reduce computation overhead and to ignore brief touches (e.g., 2 seconds). The period of time can be selected to be sufficiently short to mitigate degradation of antenna performance (e.g., 0.5 seconds). For clarity, method 1000 monitors edge information. In one or more embodiments, edge information can be combined with other sources of information that sense or infer touching of the communication device. For example, an impedance sensor can detect a change in impedance of a particular antenna.

Returning to FIG. 10, method 1000 includes receiving frequency information from the modem (block 1001). Each antenna has variations in input impedance as a function frequency. Determining an appropriate tune code for the antenna requires knowing what frequency is being used. Method 1000 includes determining whether a change in the edge information has occurred (decision block 1004). In response to determining that the change in the edge information has occurred in block 1004, method 1000 includes comparing the edge information to defined handgrip patterns: (i) tight right handgrip; (ii) tight left handgrip; (iii) loose right handgrip; (iv) loose left handgrip; (v) tight indeterminate grip; and (vi) loose indeterminate grip (block 1006). As an example, an indeterminate grip can be a pattern of a thumb and a finger that is insufficient for determining right or left handgrips. Method 1000 includes determining whether the edge information matches one of the defined handgrip patterns (decision block 1008). In one or more embodiments, tight indeterminate grip can use the same tune code as tight right handgrip and loose indeterminate grip can use the same tune code as loose right handgrip. Use of the right hand is more likely than use of the left hand due to right hand dominance. In one or more embodiments, tight indeterminate grip can use the same tune code as tight left handgrip and loose indeterminate grip can use the same tune code as loose left handgrip when touch screen use is detected. Use of the right hand for touch screen use is more likely than use of the left hand due to right hand dominance. In response to determining that the edge information does not match one of the defined handgrip patterns in block 1008, method 1000 includes configuring the RF frontend using a default tune code (block 1010). After block 1010, method 1000 returns to block 1002. In response to determining that the edge information matches one of the defined handgrip patterns in block 1008, method 1000 includes determining a tune code associated with the matched handgrip pattern using a truth table (block 1012). Method 1000 includes configuring the RF frontend using the tune code (block 1014). After block 1014, method 1000 returns to block 1002.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
    a housing assembly having right and left lateral edges;
    at least one display device supported by the housing assembly and having right and left edge displays that are touch-sensitive, the right and left edge displays extending along at least a substantial portion respectively of the right and the left lateral edges;
    more than one antenna positioned along the right and left lateral edges;
    a radio frequency (RF) front end comprising:
        one or more transceivers; and
        an antenna switching and tuning network that communicatively connects the one or more transceivers to the more than one antenna;
    a controller communicatively coupled to the at least one display device and the RF front end, and which:
        determines portions of the left and the right edge displays that are being touched by an object;
        identifies at least one antenna that is proximate to the portions of the left and the right edge displays that are being touched; and
        configures the RF front end to switch or tune the at least one antenna in order to provide at least one of: mitigating detrimental effects to antenna performance by the at least one antenna and remaining within regulatory limits for RF transmission exposure.

2. The communication device of claim 1, wherein the controller:
    identifies a pattern of multiple touches on at least one of the right and left edge displays;
    compares the pattern of multiple touches to two or more predefined patterns for a right-handed and a left-handed grip;
    determines which of the right-handed grip and the left-handed grip the pattern of multiple touches corresponds to; and
    selectively associates an antenna switching and tuning configuration based on the determined one of the right-handed or the left-handed grip.

3. The communication device of claim 2, wherein:
    the more than one antenna comprises a rearward facing antenna positioned at a back surface of the housing assembly; and
    the controller:
        determines that the pattern of multiple touches indicates that a finger is positioned proximate to the rearward facing antenna; and
        in response to determining that the finger is positioned proximate to the rearward facing antenna, configures the RF front end to switch or tune the rearward facing antenna in order to provide at least one of: mitigating detrimental effects to antenna performance by the at least one antenna and remaining within regulatory limits for RF transmission exposure.

4. The communication device of claim 1, wherein:
    the housing assembly has a bottom edge;
    the at least one display device comprises a bottom edge display that is touch sensitive and which extends along at least a substantial portion of the bottom edge;
    at least one base antenna of the more than one antenna is positioned at the bottom edge; and
    the controller:
        determines when at least one portion of the bottom edge display is being touched by the object;
        identifies that the at least one base antenna is proximate to the at least one portion of the bottom edge display that is touched by the object; and
        configures the RF front end to switch or tune the at least one base antenna positioned at the bottom edge in order to provide at least one of: mitigating detrimental effects to antenna performance by the at least one antenna and remaining within regulatory limits for RF transmission exposure.

5. The communication device of claim 4, wherein the controller:
- identifies a pattern of multiple touches on the right, left, and bottom edge displays;
- compares the pattern of multiple touches to two or more predefined patterns for a right-handed and a left-handed grip;
- determines that the pattern of multiple touches indicates one of: (i) a first state comprising a right-handed grip without palm contact; (ii) a second state comprising a right-handed grip with palm contact; (iii) a third state comprising a left-handed grip without palm contact; or (iv) a fourth state comprising a left-handed grip with palm contact;
- selectively associates an antenna switching and tuning configuration based on the determined one of the first, the second, the third, or the fourth state.

6. The communication device of claim 5, wherein the controller:
- determines a reference line between the right and left lateral sides based on a longitudinal position of the pattern of multiple touches; and
- determines a palm position of a hand based on the reference line.

7. The commercial device of claim 1, wherein the left and the right edge displays comprise portions of a front display device of the at least one display device.

8. A method comprising:
- monitoring left and right edge displays of at least one display device that extend along at least a substantial portion respectively of right and left lateral edges of a housing assembly of a communication device having more than one antennas positioned along the right and left lateral edges;
- determining portions of at least one of the left and the right edge displays that are being touched by an object;
- identifying, from among the more than one antennas, at least one antenna that is proximate to the portions of the left and the right edge displays that are being touched; and
- configuring a radio frequency (RF) front end of the communication device to switch or tune the at least one antenna in order to provide at least one of: mitigating detrimental effects to antenna performance by the at least one antenna or remaining within regulatory limits for RF transmission exposure.

9. The method of claim 8, further comprising:
- identifying a pattern of multiple touches on at least one of the right and left edge displays;
- comparing the pattern of multiple touches to two or more predefined patterns for a right-handed and a left-handed grip;
- determining which of the right-handed grip and the left-handed grip the pattern of multiple touches corresponds to; and
- selectively associating an antenna switching and tuning configuration based on the determined one of the right-handed or the left-handed grip.

10. The method of claim 9, further comprising:
- determining that the pattern of multiple touches indicates that a finger of a hand is positioned proximate to the rearward facing antenna; and
- in response to determining that the finger is positioned proximate to the rearward facing antenna, configuring the RF front end to switch or tune a rearward facing antenna positioned at a back surface of the housing assembly in order to provide at least one of: mitigating detrimental effects to antenna performance by the at least one antenna and remaining within regulatory limits for RF transmission exposure.

11. The method of claim 8, further comprising:
- monitoring bottom edge display of the at least one display device that extend along at least a substantial portion respectively of a bottom edge of the housing assembly;
- determining when at least one portion of the bottom edge display is being touched by the object;
- identifying that at least one base antenna of the more than one antenna is proximate to the at least one portion of the bottom edge display that is touched; and
- configuring the RF front end to switch or tune the at least one antenna positioned at the bottom edge in order to provide at least one of: mitigating detrimental effects to antenna performance by the at least one antenna and remaining within regulatory limits for RF transmission exposure.

12. The method of claim 11, further comprising:
- identifying a pattern of multiple touches on the right, left, and bottom edge displays;
- comparing the pattern of multiple touches to two or more predefined patterns for a right and left-handed grips;
- determining that the pattern of multiple touches indicates one of: (i) a first state comprising a right-handed grip without palm contact; (ii) a second state comprising a right-handed grip with palm contact; (iii) a third state comprising a left-handed grip without palm contact; or (iv) fourth state comprising a left-handed grip with palm contact; and
- selectively associating an antenna switching and tuning configuration based on the determined one of the first, the second, the third, or the fourth state.

13. The method of claim 12, further comprising:
- determining a reference line between the right and left lateral sides based on a longitudinal position of the pattern of multiple touches; and
- determining a palm position of a hand based on the reference line.

14. A computer program product comprising:
- a computer readable storage device; and
- program code on the computer readable storage device that when executed by a processor associated with a device, the program code enables the communication device to provide the functionality of:
  - monitoring left and right edge displays of at least one display device that extend along at least a substantial portion respectively of right and left lateral edges of a housing assembly of a communication device having more than one antennas positioned along the right and left lateral edges;
  - determining portions of at least one of the left and the right edge displays that are being touched by an object;
  - identifying, from among the more than one antennas, at least one antenna that is proximate to the portions of the left and the right edge displays that are being touched; and
  - configuring a radio frequency (RF) front end of the communication device to switch or tune the at least one antenna in order to provide at least one of: mitigating detrimental effects to antenna performance by the at least one antenna and remaining within regulatory limits for RF transmission exposure.

15. The computer program product of claim 14, wherein the program code enables the communication device to provide the functionality of:
- identifying a pattern of multiple touches on at least one of the right and left edge displays;
- comparing the pattern of multiple touches to two or more predefined patterns for a right-handed and a left-handed grip;
- determining which of the right-handed grip and the left-handed grip the pattern of multiple touches corresponds to; and
- selectively associating an antenna switching and tuning configuration based on the determined one of the right-handed or the left-handed grip.

16. The computer program product of claim 15, wherein the program code enables the communication device to provide the functionality of:
- determining that the pattern of multiple touches indicates that a finger of a hand is positioned proximate to the rearward facing antenna; and
- in response to determining that the finger is positioned proximate to the rearward facing antenna, configuring the RF front end to switch or tune a rearward facing antenna positioned at a back surface of the housing assembly in order to provide at least one of: mitigating detrimental effects to antenna performance by the at least one antenna and remaining within regulatory limits for RF transmission exposure.

17. The computer program product of claim 14, wherein the program code enables the communication device to provide the functionality of:
- monitoring bottom edge display of the at least one display device that extend along at least a substantial portion respectively of a bottom edge of the housing assembly;
- determining when at least one portion of the bottom edge display is being touched by the object;
- identifying that at least one base antenna of the more than one antenna is proximate to the at least one portion of the bottom edge display that is touched; and
- configuring the RF front end to switch or tune the at least one antenna positioned at the bottom edge in order to provide at least one of: mitigating detrimental effects to antenna performance by the at least one antenna and remaining within regulatory limits for RF transmission exposure.

18. The computer program product of claim 17, wherein the program code enables the communication device to provide the functionality of:
- identifying a pattern of multiple touches on the right, left, and bottom edge displays;
- comparing the pattern of multiple touches to two or more predefined patterns for a right and left-handed grips;
- determining that the pattern of multiple touches indicates one of: (i) a first state comprising a right-handed grip without palm contact; (ii) a second state comprising a right-handed grip with palm contact; (iii) a third state comprising a left-handed grip without palm contact; or (iv) fourth state comprising a left-handed grip with palm contact; and
- selectively associating an antenna switching and tuning configuration based on the determined one of the first, the second, the third, or the fourth state.

19. The computer program product of claim 14, wherein the program code enables the communication device to provide the functionality of:
- determining a reference line between the right and left lateral sides based on a longitudinal position of the pattern of multiple touches; and
- determining a palm position of a hand based on the reference line.

* * * * *